US010005445B2

(12) United States Patent
Tamai et al.

(10) Patent No.: US 10,005,445 B2
(45) Date of Patent: Jun. 26, 2018

(54) HYDRAULIC CONTROL DEVICE FOR AUTOMATIC TRANSMISSION AND CONTROL METHOD THEREFOR

(71) Applicant: JATCO Ltd, Fuji-shi, Shizuoka (JP)

(72) Inventors: Kohshi Tamai, Fuji (JP); Takao Arimatsu, Odawara (JP)

(73) Assignee: JATCO Ltd, Fuji-Shi (JP)

( * ) Notice: Subject to any disclaimer, the term of this patent is extended or adjusted under 35 U.S.C. 154(b) by 27 days.

(21) Appl. No.: 15/319,460

(22) PCT Filed: Feb. 16, 2015

(86) PCT No.: PCT/JP2015/054130
§ 371 (c)(1),
(2) Date: Dec. 16, 2016

(87) PCT Pub. No.: WO2015/194206
PCT Pub. Date: Dec. 23, 2015

(65) Prior Publication Data
US 2017/0320478 A1    Nov. 9, 2017

(30) Foreign Application Priority Data

Jun. 19, 2014  (JP) .................................. 2014-126672

(51) Int. Cl.
| | |
|---|---|
| *F16H 61/08* | (2006.01) |
| *B60W 10/06* | (2006.01) |
| *B60W 10/115* | (2012.01) |
| *B60W 10/18* | (2012.01) |
| *B60W 30/18* | (2012.01) |
| *F16D 41/04* | (2006.01) |
| *F16H 61/04* | (2006.01) |

(52) U.S. Cl.
CPC .......... *B60W 10/06* (2013.01); *B60W 10/115* (2013.01); *B60W 10/182* (2013.01); *B60W 30/18027* (2013.01); *F16D 41/04* (2013.01); *F16D 2500/3144* (2013.01); *F16H 61/08* (2013.01); *F16H 2061/0481* (2013.01)

(58) Field of Classification Search
None
See application file for complete search history.

(56) References Cited

U.S. PATENT DOCUMENTS

| | | | |
|---|---|---|---|
| 5,090,270 A * | 2/1992 | Suzuki .................. | F16H 61/068 477/117 |
| 2008/0125944 A1 | 5/2008 | Kamishima et al. | |
| 2009/0269997 A1 | 10/2009 | Suzuki et al. | |

FOREIGN PATENT DOCUMENTS

| | | |
|---|---|---|
| EP | 2236848 A1 | 6/2010 |
| JP | S63-001843 A | 1/1988 |
| JP | 04-123939 A | 4/1992 |
| JP | 2003-097659 A | 4/2003 |

(Continued)

*Primary Examiner* — Dirk Wright
(74) *Attorney, Agent, or Firm* — Foley & Lardner LLP (57) ABSTRACT

A vehicle control device including an electronically controlled throttle device and configured to control a vehicle for supplying a hydraulic pressure to a friction engaging element of a transmission on the basis of a throttle valve opening controls a start timing of a supply of the hydraulic pressure to the friction engaging element on the basis of an accelerator pedal opening and the throttle valve opening if a shift lever is changed from an advance position to a reverse position or from the reverse position to the advance position.

11 Claims, 7 Drawing Sheets

(56) References Cited

FOREIGN PATENT DOCUMENTS

| JP | 2004-278767 | A | 10/2004 |
|---|---|---|---|
| JP | 3630790 | B2 | 3/2005 |
| JP | 2008-126933 | A | 6/2008 |
| JP | 2009-264430 | A | 11/2009 |

\* cited by examiner

HYDRAULIC CONTROL DEVICE FOR AUTOMATIC TRANSMISSION AND CONTROL METHOD THEREFOR

TECHNICAL FIELD

The present invention relates to a hydraulic control of an automatic transmission.

BACKGROUND ART

A vehicle with an electronically controlled throttle device for changing a throttle valve opening by operating an electric actuator on the basis of an accelerator pedal opening is disclosed in JP2003-97659A.

SUMMARY OF INVENTION

In the above vehicle, in the case of engaging a friction engaging element of a transmission, the throttle valve opening is detected by a throttle valve opening sensor, an input torque to the transmission is calculated on the basis of the throttle valve opening and a hydraulic pressure supplied to the friction engaging element is controlled on the basis of the input torque. That is, the hydraulic pressure supplied to the friction engaging element is controlled on the basis of the throttle valve opening.

In the case of performing a so-called garage shift of changing from an advance position to a reverse position or from the reverse position to the advance position, a driver wishes to immediately start a vehicle after the operation of a shift lever. In such a situation, the friction engaging element has to be quickly engaged according to the operation of the shift lever. A method for increasing a climb gradient of the hydraulic pressure supplied to the friction engaging element is, for example, considered as a method for quickly engaging the friction engaging element.

However, if the friction engaging element is quickly engaged by the method for increasing the climb gradient of the hydraulic pressure or the like, an engagement shock at the time of engaging the friction engaging element may be large.

Further, a method for controlling the hydraulic pressure supplied to the friction engaging element by reading a driver's intention to start on the basis of the behavior of the throttle valve opening is, for example, considered as the method for quickly engaging the friction engaging element.

However, if the throttle valve opening is smaller than the accelerator pedal opening and delay opening is caused, an engagement timing of the friction engaging element is delayed with respect to the driver's intention to start if the hydraulic pressure supplied to the friction engaging element is controlled on the basis of the behavior of the throttle valve opening, whereby a sense of incongruity may be given to the driver.

The present invention was developed in view of such a problem and aims to suppress an increase of an engagement shock and suppress the engagement of a friction engaging element at a timing different from a driver's intention to start at the time of a garage shift.

A hydraulic control device for automatic transmission according to a certain aspect of the present invention is a hydraulic control device for automatic transmission including an electronically controlled throttle device for changing a throttle valve opening of a prime mover by an electric actuator on the basis of an accelerator pedal opening and configured to supply a hydraulic pressure to a friction engaging element of a transmission on the basis of the throttle valve opening. The hydraulic control device includes accelerator pedal opening detection means configured to detect the accelerator pedal opening, throttle valve opening detection means configured to detect the throttle valve opening, shift lever position detection means configured to detect a position of a shift lever, and hydraulic control means configured to control a start timing of a supply of the hydraulic pressure to the friction engaging element on the basis of the accelerator pedal opening and the throttle valve opening if the shift lever is changed from an advance position to a reverse position or from the reverse position to the advance position.

A control method for a hydraulic control device according to another aspect of the present invention is a control method for a hydraulic control device including an electronically controlled throttle device for changing a throttle valve opening of a prime mover by an electric actuator on the basis of an accelerator pedal opening and configured to supply a hydraulic pressure to a friction engaging element of a transmission on the basis of the throttle valve opening. The control method includes detecting the accelerator pedal opening, detecting the throttle valve opening, detecting a position of a shift lever, and controlling a start timing of a supply of the hydraulic pressure to the friction engaging element on the basis of the accelerator pedal opening and the throttle valve opening if the shift lever is changed from an advance position to a reverse position or from the reverse position to the advance position.

According to these aspects, the start timing of the supply of the hydraulic pressure to the friction engaging element is controlled on the basis of the accelerator pedal opening and the throttle valve opening when the shift lever is changed from the advance position to the reverse position or from the reverse position to the advance position. Thus, it is possible to suppress an increase of an engagement shock at the time of engaging the friction engaging element and suppress the engagement of the friction engaging element at a timing different from a driver's intention to start.

DESCRIPTION OF EMBODIMENTS

Hereinafter, an embodiment of the present invention is described with reference to the accompanying drawings. It should be noted that, in the following description, a "speed ratio" of a certain transmission mechanism is a value obtained by dividing an input rotation speed of this transmission mechanism by an output rotation speed thereof.

Figure 1:
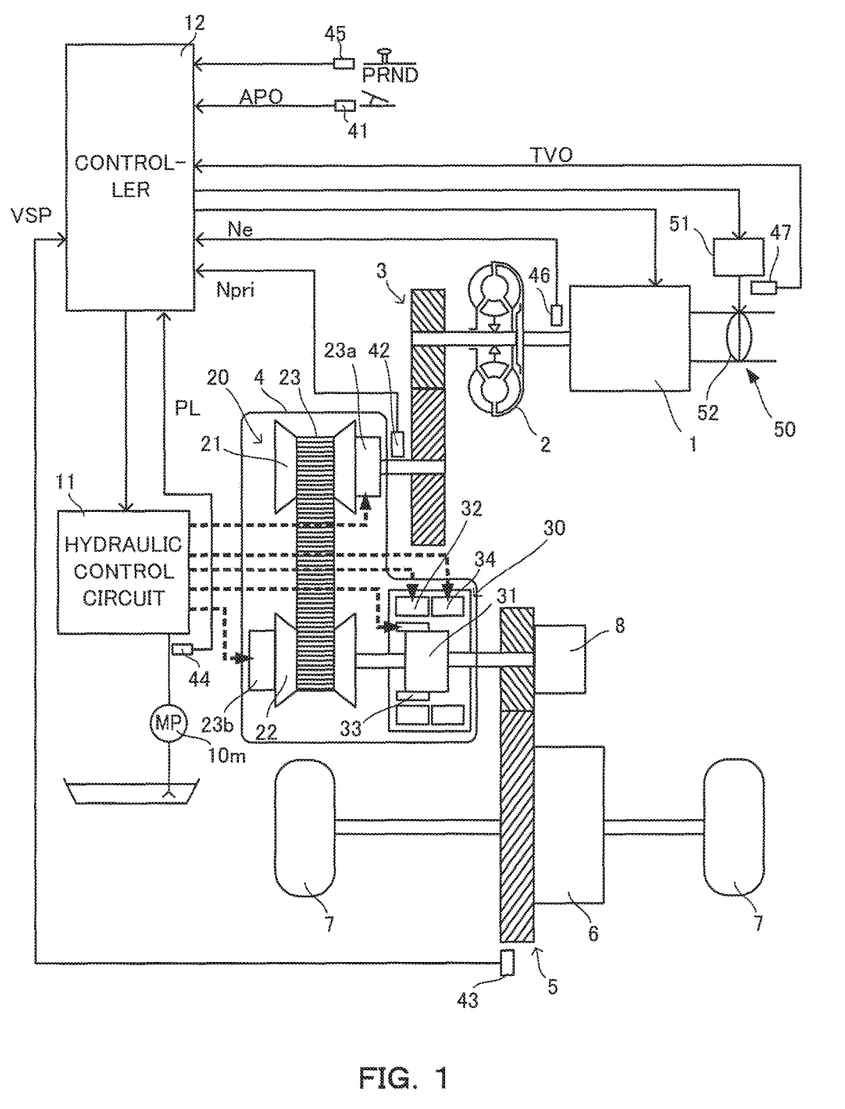
FIG. 1 is a schematic configuration diagram of a vehicle according to an embodiment.

FIG. 1 is a schematic configuration diagram of a vehicle according to the present embodiment. This vehicle includes an engine 1 as a drive source, and the output rotation of the engine 1 is transmitted to drive wheels 7 via a torque converter 2 with a lock-up clutch, a first gear train 3, a transmission 4, a second gear train 5 and a differential device 6.

Further, the vehicle includes an electronically controlled throttle device 50 in which an opening of a throttle valve 52 (hereinafter, referred to as a "throttle valve opening TVO") is controlled by a throttle actuator 51 configured to operate according to an operation amount of an accelerator pedal (hereinafter, referred to as an "accelerator pedal opening APO") or the like.

The transmission 4 is provided with a mechanical oil pump 10m to which the rotation of the engine 1 is input and which is driven utilizing part of power of the engine 1. Further, the transmission 4 is provided with a hydraulic control circuit 11 for adjusting a hydraulic pressure from the mechanical oil pump 10m (hereinafter, referred to as a "line pressure PL") and supplying the adjusted hydraulic pressure to each component of the transmission 4.

The transmission 4 includes a V-belt continuously variable transmission mechanism (hereinafter, referred to as a "variator 20") and a sub-transmission mechanism 30.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of this movable conical plate for displacing the movable conical plate in an axial direction. When hydraulic pressures supplied to the hydraulic cylinders 23a, 23b are adjusted, the widths of the V-grooves change to change a contact radius of the V-belt 23 and each pulley 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of friction engaging elements (low brake 32, high clutch 33, reverse brake 34) which are connected to a plurality of rotation elements constituting the Ravigneaux-type planetary gear mechanism 31 to change coupled states of these rotation elements. By adjusting a hydraulic pressure supplied to each friction engaging element 32 to 34 to change an engaged/disengaged state of each friction engaging element 32 to 34, a gear position of the sub-transmission mechanism 30 is changed. Specifically, a first gear position is achieved by engaging the low brake 32 and disengaging the high clutch 33 and the reverse brake 34, and a second gear position is achieved by engaging the high clutch 33 and disengaging the low brake 32 and the reverse brake 34. Further, a reverse gear position is achieved by engaging the reverse brake 34 and disengaging the low brake 32 and the high clutch 33.

In the sub-transmission mechanism 30, the low brake 32 is engaged and the first gear position is achieved when a shift lever is changed to a D-range which is an advance position, and the reverse brake 34 is engaged and the reverse gear position is achieved when the shift lever is changed to an R-range which is a reverse position.

Figure 2:
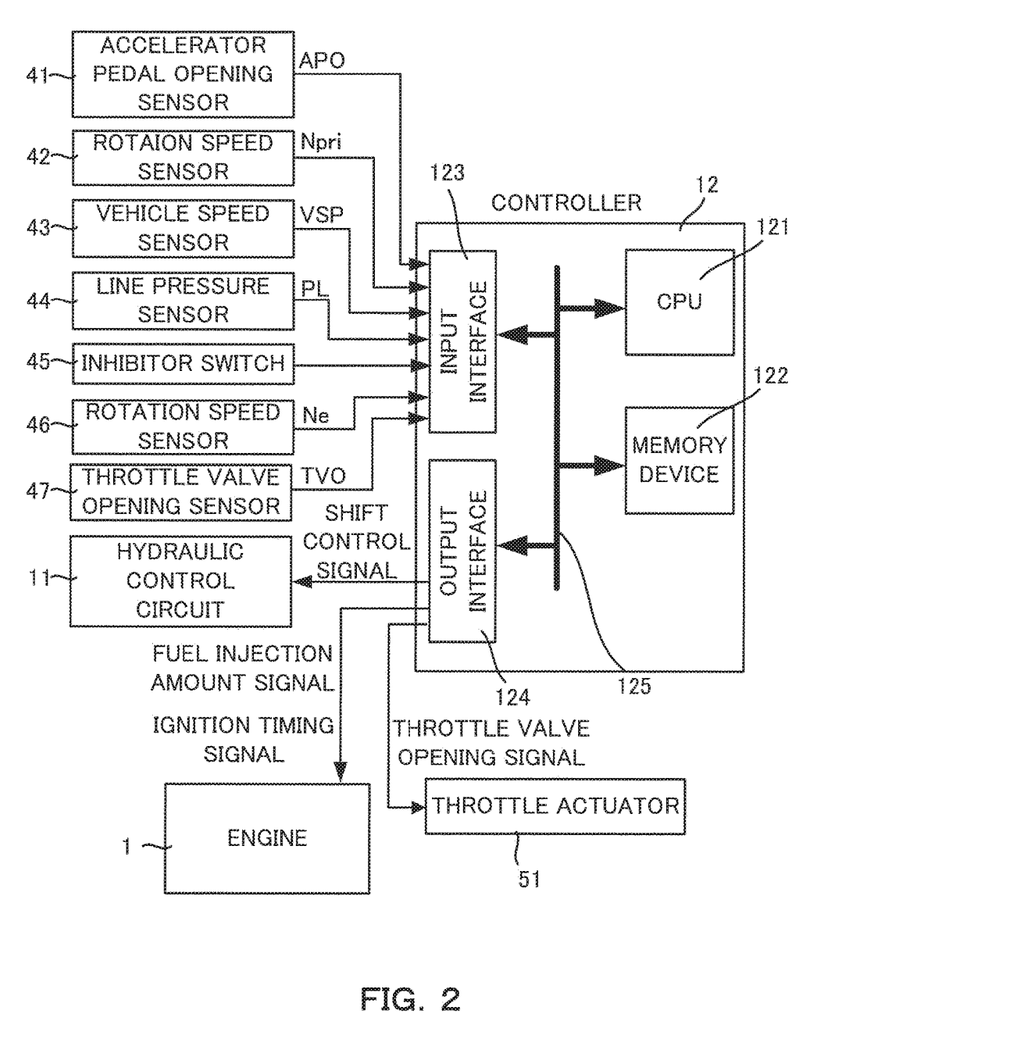
FIG. 2 is a schematic configuration diagram of a controller.

A controller 12 is a controller for comprehensively controlling the engine 1 and the transmission 4 and, as shown in FIG. 2, configured by a CPU 121, a memory device 122 composed of a RAM and a ROM, an input interface 123, an output interface 124 and a bus 125 for connecting these components to each other.

To the input interface 123 are input an output signal of an accelerator pedal opening sensor 41 for detecting the accelerator pedal opening APO, an output signal of a throttle valve opening sensor 47 for detecting the throttle valve opening TVO, an output signal of a rotation speed sensor 42 for detecting an input rotation speed Npri of the transmission 4, an output signal of a vehicle speed sensor 43 for detecting a vehicle speed VSP, an output signal of a line pressure sensor 44 for detecting the line pressure PL, an output signal of an inhibitor switch 45 for detecting the position of the shift lever, an output signal of a rotation speed sensor 46 for detecting an engine rotation speed Ne and the like.

A control program of the engine 1, a shift control program of the transmission 4 and various map tables used in these programs are stored in the memory device 122. The CPU 121 reads and executes the program stored in the memory device 122, performs various computations on various signals input via the input interface 123 to generate drive signals of a fuel injection amount signal, an ignition timing signal, a throttle valve opening signal and a shift control signal, and outputs the generated signals to the engine 1, the throttle actuator 51 and the hydraulic control circuit 11 via the output interface 124. Various values used in the computations by the CPU 121 and computation results thereof are appropriately stored in the memory device 122.

The hydraulic control circuit 11 is composed of a plurality of flow passages and a plurality of hydraulic control valves. On the basis of a shift control signal from the controller 12, the hydraulic control circuit 11 controls the plurality of hydraulic control valves to switch supply paths of the hydraulic pressure, prepares a necessary hydraulic pressure from the line pressure PL generated by the mechanical oil pump 10m and supplies this to each component of the transmission 4. In this way, the speed ratio of the transmission 4 (speed ratio of the variator 20 and gear position of the sub-transmission mechanism 30) is changed.

Figure 3:
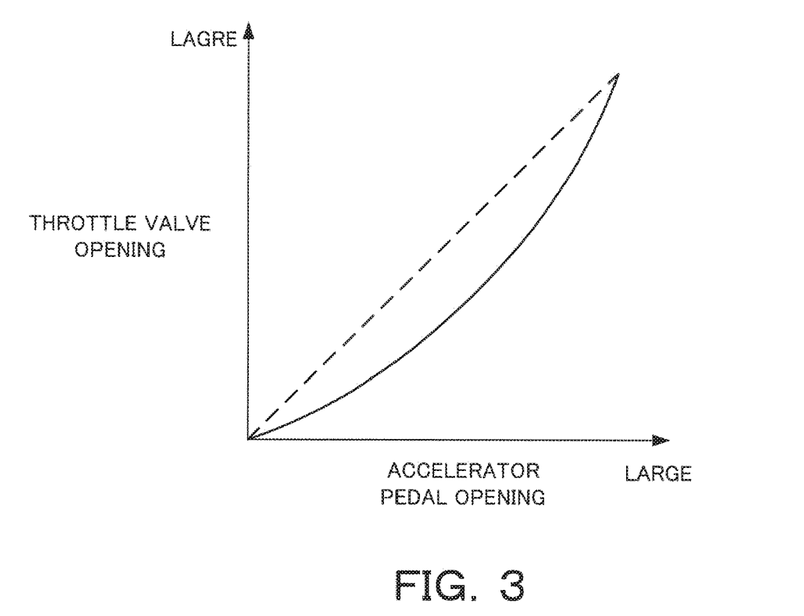
FIG. 3 is a graph showing a relationship of an accelerator pedal opening and a throttle valve opening.

In the present embodiment, the throttle valve opening TVO is related to the accelerator pedal opening APO as shown in FIG. 3 and in a so-called delay opening relationship in which the throttle valve opening TVO is smaller than the accelerator pedal opening APO. In FIG. 3, a case where the throttle valve opening TVO and the accelerator pedal opening APO are equal (one-to-one relationship) is shown in broken line for description. It should be noted that the throttle valve opening TVO means an opening ratio to a full open value of the throttle valve 52 and the accelerator pedal opening APO means an opening ratio to a full open value of the accelerator pedal.

Figure 4:
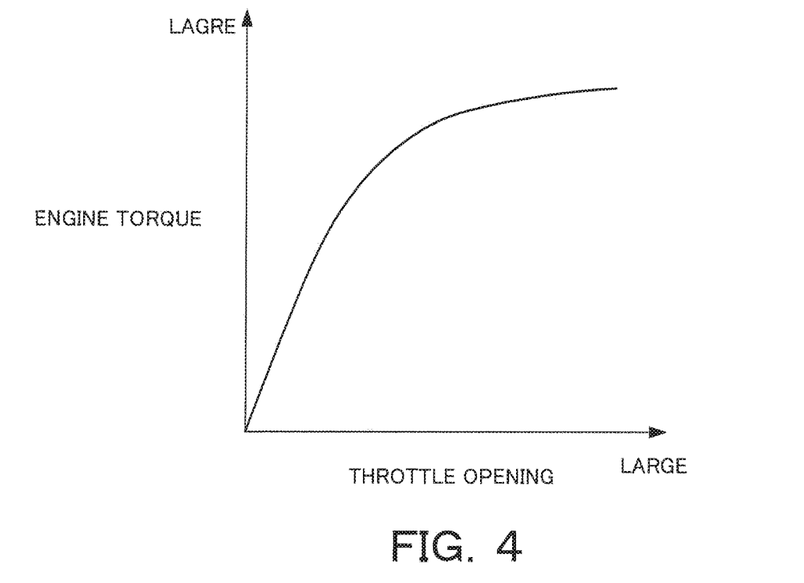
FIG. 4 is a graph showing a relationship of the throttle valve opening and an engine torque.
Figure 5:
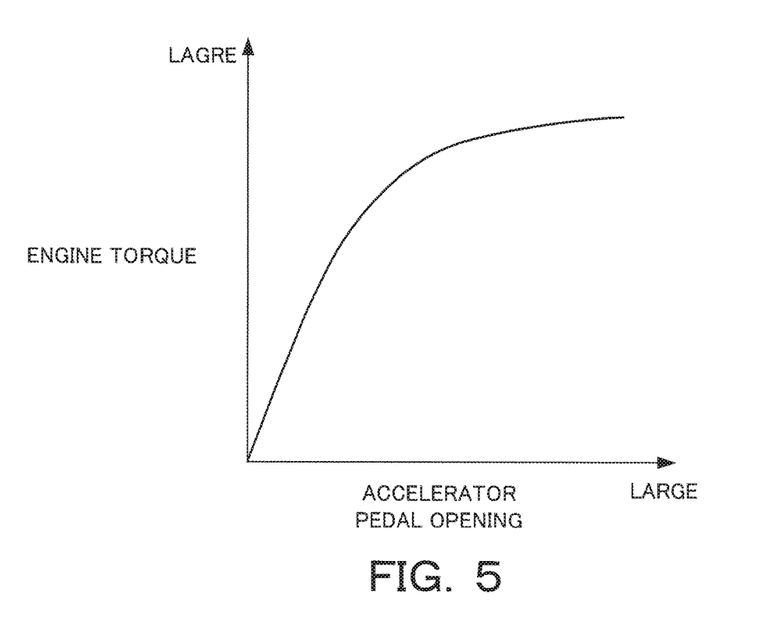
FIG. 5 is a graph showing the accelerator pedal opening and the engine torque in a comparative example.

The throttle valve opening TVO and an engine torque are related as shown in FIG. 4. When the throttle valve opening TVO increases, an increase amount of the engine torque becomes smaller. If the relationship of the throttle valve opening TVO and the accelerator pedal opening APO is set as shown in broken line of FIG. 3, the accelerator pedal opening APO and the engine torque show a tendency similar to the one in FIG. 4 as shown in FIG. 5 and an increase amount of the engine torque becomes smaller when the accelerator pedal opening APO increases.

Figure 6:
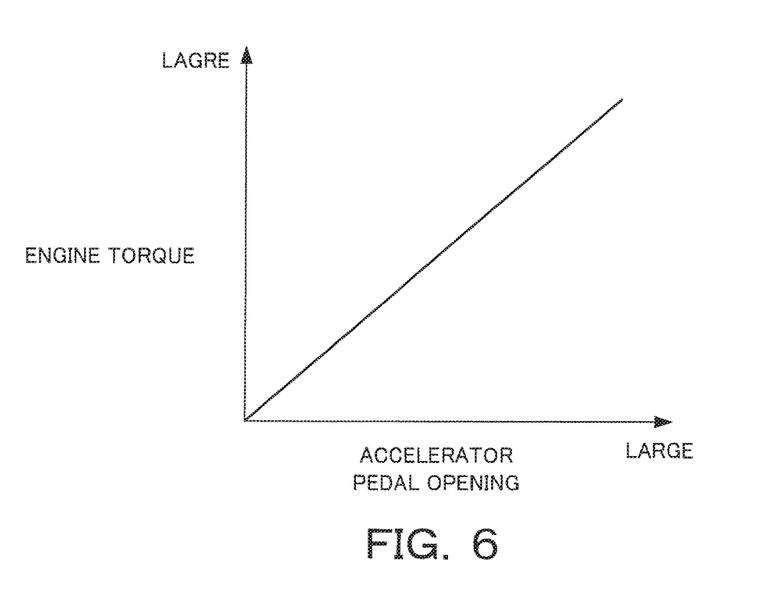
FIG. 6 is a graph showing the accelerator pedal opening and the engine torque in the embodiment.

On the other hand, if the throttle valve opening TVO is delayed with respect to the accelerator pedal opening APO, the accelerator pedal opening APO and the engine torque are related as shown in FIG. 6 and the engine torque is linearly related to the accelerator pedal opening APO.

If the shift lever is changed from an N-range to the D-range or the R-range, the supply of the hydraulic pressure to the low brake 32 or the reverse brake 34 of the sub-transmission mechanism 30 is normally controlled on the basis of the throttle valve opening TVO (hereinafter, this control is referred to as a "normal select control").

In the case of performing a so-called garage shift in which the shift lever is switched from the R-range to the D-range or from the D-range to the R-range within a short time, a driver expects a quick start of the vehicle. However, if the throttle valve opening TVO is delayed with respect to the accelerator pedal opening APO as described above, the hydraulic pressure is supplied to the low brake 32 or the reverse brake 34 at a delayed timing since the throttle valve opening TVO is smaller than the accelerator pedal opening APO. Thus, the low brake 32 or the reverse brake 34 is engaged at a delayed timing and the vehicle cannot be quickly started.

Figure 7:
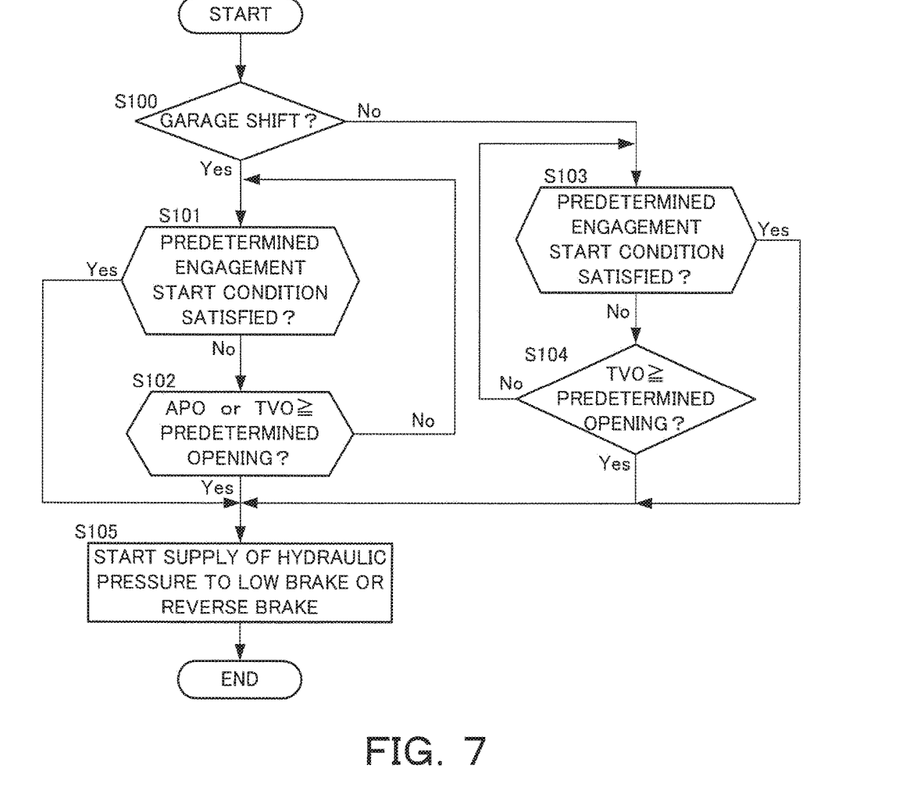
FIG. 7 is a flow chart showing an engagement control of a first embodiment.

Accordingly, in the present embodiment, an engagement control shown in FIG. 7 is executed. FIG. 7 is a flow chart showing the engagement control in the case of operating the shift lever.

In Step S100, the controller 12 determines whether or not the garage shift has been performed. Specifically, the controller 12 determines whether or not the shift lever has been changed from the D-range to the R-range or from the R-range to the D-range within a predetermined short time set in advance. A process proceeds to Step S101 if the garage shift has been performed while proceeding to Step S103 unless the garage shift has been performed.

In Step S101, the controller 12 determines whether or not a predetermined engagement start condition is satisfied. The predetermined engagement start condition is a condition for starting the engagement of the low brake 32 or the reverse brake 34 except for the throttle valve opening TVO reaching a predetermined opening and, for example, a case where the engine rotation speed Ne is high and the engagement of the low brake 32 or the reverse brake 34 is started to protect the transmission 4. The process proceeds to Step S105 if the predetermined engagement start condition is satisfied while proceeding to Step S102 unless the predetermined engagement start condition is satisfied.

In Step S102, the controller 12 determines whether or not the accelerator pedal opening APO or the throttle valve opening TVO has become equal to or larger than a predetermined opening (threshold value). The predetermined opening is an opening set in advance and an opening capable of determining the driver's intention to start. The process proceeds to Step S105 if the throttle valve opening TVO is not smaller than the predetermined opening while returning to Step S101 if the throttle valve opening TVO is smaller than the predetermined opening.

In Step S103, the controller 12 determines whether or not the predetermined engagement start condition is satisfied. The process proceeds to Step S105 if the predetermined engagement start condition is satisfied while proceeding to Step S104 unless the predetermined engagement start condition is satisfied.

In Step S104, the controller 12 determines whether or not the throttle valve opening TVO has become equal to or larger than the predetermined opening. The process proceeds to Step S105 if the throttle valve opening TVO is not smaller than the predetermined opening while returning to Step S103 if the throttle valve opening TVO is smaller than the predetermined opening.

In Step S105, the controller 12 starts the supply of the hydraulic pressure to the low brake 32 or the reverse brake 34 according to the position of the shift lever and starts engaging the low brake 32 or the reverse brake 34.

Since the throttle valve opening TVO is delayed with respect to the accelerator pedal opening APO in the present embodiment, the accelerator pedal opening APO reaches the predetermined opening before the throttle valve opening TVO reaches the predetermined opening. In the case of performing the garage shift, the supply of the hydraulic pressure to the low brake 32 or the reverse brake 34 is started and the engagement of the low brake 32 or the reverse brake 34 is started when the accelerator pedal opening APO reaches the predetermined opening. Accordingly, the low brake 32 or the reverse brake 34 is engaged at an earlier timing than in the normal select control in which the supply of the hydraulic pressure to the low brake 32 or the reverse brake 34 is started on the basis of the throttle valve opening TVO, whereby the vehicle can be quickly started.

Effects of the first embodiment of the present invention are described.

In the case of performing the garage shift, the hydraulic pressure supplied to the low brake 32 or the reverse brake 34 is controlled on the basis of the accelerator pedal opening APO and the throttle valve opening TVO. Specifically, in the case of performing the garage shift, the supply of the hydraulic pressure to the low brake 32 or the reverse brake 34 is started on the basis of the accelerator pedal opening APO. Since this causes the supply of the hydraulic pressure to the low brake 32 or the reverse brake 34 to be started on the basis of the accelerator pedal opening APO at the time of the garage shift even if the throttle valve opening TVO is delayed with respect to the accelerator pedal opening APO, a delay of the engagement timing of the low brake 32 or the reverse brake 34 can be suppressed.

It should be noted that, in the present embodiment, the engagement timing of the low brake 32 or the reverse brake 34 is made earlier by making the hydraulic pressure supply start timing of the low brake 32 or the reverse brake 34 at the time of the garage shift earlier, but is not made earlier by a method for increasing a climb gradient of the hydraulic pressure or the like. Thus, in the case of performing the garage shift, the low brake 32 or the reverse brake 34 can be engaged without causing a large engagement shock.

It is possible to keep the accelerator pedal opening APO and the engine torque in a linear relationship and suppress a delay of the engagement timing of the low brake 32 or the reverse brake 34 in the case of performing the garage shift.

Next, a second embodiment of the present invention is described.

The second embodiment differs from the first embodiment in the engagement control when the shift lever is operated. An engagement control of the second embodiment when the shift lever is operated is described using a flow chart of FIG. 8.

Figure 8:
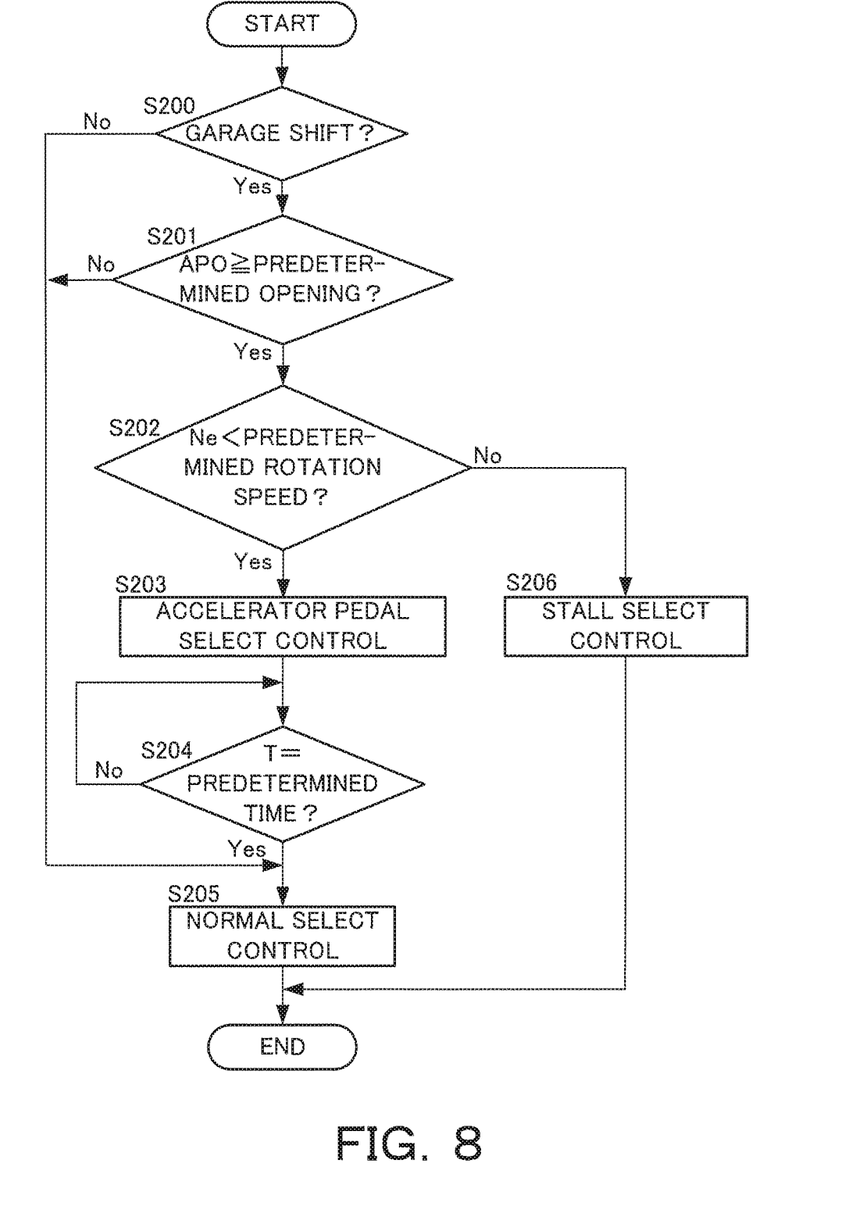
FIG. 8 is a flow chart showing an engagement control of a second embodiment.

In Step S200, the controller 12 determines whether or not the garage shift has been performed. A process proceeds to Step S201 if the garage shift has been performed while proceeding to Step S205 unless the garage shift has been performed.

In Step S201, the controller 12 determines whether or not the accelerator pedal opening APO is not smaller than a predetermined opening (threshold value). The process proceeds to Step S202 if the accelerator pedal opening APO is not smaller than the predetermined opening while proceeding to Step S205 if the accelerator pedal opening APO is smaller than the predetermined opening.

In Step S202, the controller 12 determines whether or not the engine rotation speed Ne is lower than a predetermined rotation speed. If the garage shift has been performed and the speed of the rotation transmitted from the engine 1 to the low brake 32 or the reverse brake 34 is high, a rotation speed difference between input and output shafts of the low brake 32 or the reverse brake 34 is large. Thus, if the hydraulic pressure is supplied to the low brake 32 or the reverse brake 34 by an accelerator pedal select control to be described later or the normal select control, a slip in the low brake 32 or the reverse brake 34 becomes larger and operability may be deteriorated. The predetermined rotation speed is a rotation speed set in view of such a point and a rotation speed capable of judging the need to suppress the slip in the low brake 32 or the reverse brake 34. The process proceeds to Step S203 if the engine rotation speed Ne is lower than the predetermined rotation speed while proceeding to Step S206 if the engine rotation speed Ne is not lower than the predetermined rotation speed.

In Step S203, the controller 12 starts the accelerator pedal select control. The controller 12 calculates an engine torque on the basis of the accelerator pedal opening APO, calculates the hydraulic pressure supplied to the low brake 32 or the reverse brake 34 by multiplying the calculated engine torque by a coefficient based on a torque ratio of the torque converter 2, a speed ratio, an oil temperature or the like, and controls the hydraulic pressure. Since the throttle valve opening TVO is delayed with respect to the accelerator pedal opening APO in the present embodiment, the hydraulic pressure calculated on the basis of the accelerator pedal opening APO is higher than that calculated on the basis of the throttle valve opening TVO.

In Step S204, the controller 12 measures a time elapsed after the start of the accelerator pedal select control by a timer and determines whether or not a value T of the timer has reached a predetermined time. The predetermined time is a time set in advance. It should be noted that the predetermined time may be set on the basis of the accelerator pedal opening APO. The process proceeds to Step S205 when the value T of the timer reaches the predetermined time. In the present embodiment, the hydraulic pressure is supplied to the low brake 32 or the reverse brake 34 by the accelerator pedal select control until the value T of the timer reaches the predetermined time.

In Step S205, the controller 12 starts the normal select control. The controller 12 calculates the engine torque on the basis of the throttle valve opening TVO and calculates and controls the hydraulic pressure supplied to the low brake 32 or the reverse brake 34 on the basis of the calculated engine torque. If the accelerator pedal select control has been started in Step S203, a switch is made from the accelerator pedal select control to the normal select control.

In Step S206, the controller 12 starts a stall select control. The controller 12 maximizes the line pressure PL, calculates the engine torque on the basis of the throttle valve opening TVO and calculates and controls oil supplied to the low brake 32 or the reverse brake 34 on the basis of the calculated engine torque. The hydraulic pressure in the stall select control is so set that the low brake 32 or the reverse brake 34 is engaged earlier than with the hydraulic pressures in the accelerator pedal select control and the normal select control and is, for example, so set that a hydraulic pressure climb gradient is larger than in the accelerator pedal select control and the normal select control.

Figure 9:
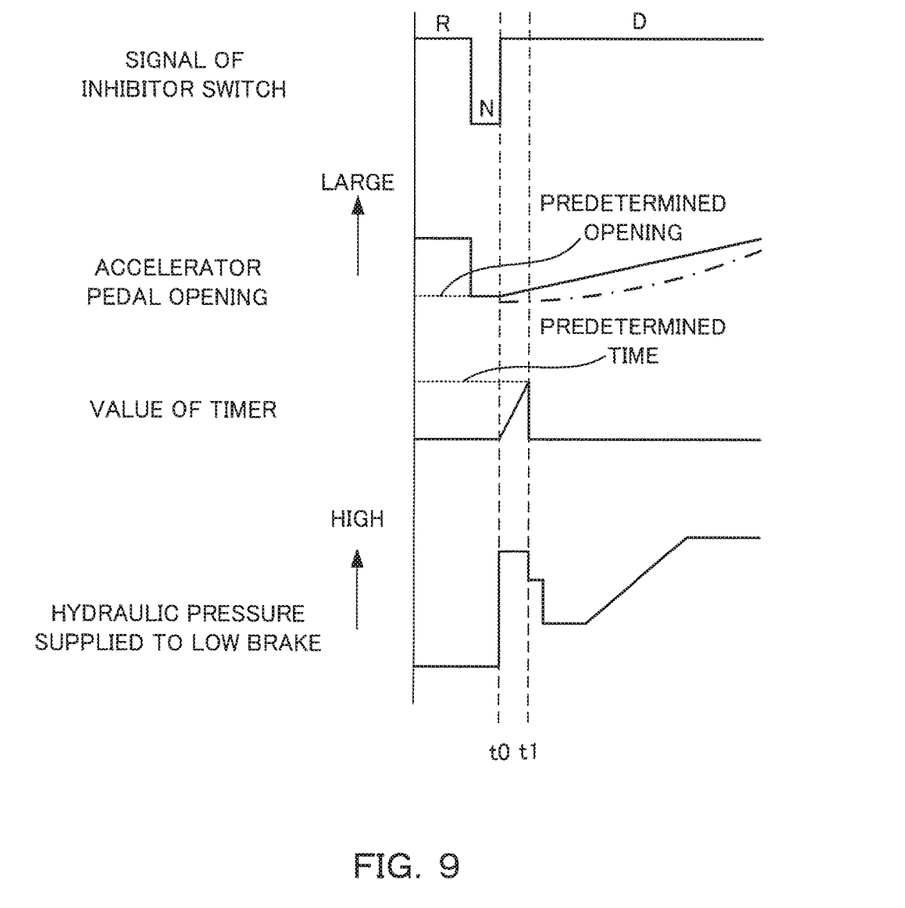
FIG. 9 is a time chart in the engagement control of the second embodiment.

Next, the engagement control of this embodiment is described using a time chart of FIG. 9. Here, it is assumed that the garage shift from the R-range to the D-range is performed.

At time t0, the shift lever is changed from the R-range to the D-range and the hydraulic pressure is supplied to the low brake 32 by the accelerator pedal select control if the accelerator pedal opening APO is not smaller than the predetermined opening. Further, a time elapsed after the start of the accelerator pedal select control is measured by the timer. Since the throttle valve opening TVO is delayed with respect to the accelerator pedal opening APO, the throttle valve opening TVO is smaller than the accelerator pedal APO. In FIG. 9, the throttle valve opening TVO is shown in dashed-dotted line.

When the value T of the timer reaches the predetermined time at time t1, a switch is made to the normal select control based on the throttle valve opening TVO and the hydraulic pressure supplied to the low brake 32 becomes lower than the hydraulic pressure during the accelerator pedal select control. Thereafter, the hydraulic pressure supplied to the low brake 32 is controlled by the normal select control. It should be noted that although the value T of the timer reaches the predetermined time and a switch is made from the accelerator pedal select control to the normal select control while a pre-charge pressure is supplied to the low brake 32 in FIG. 9, there is no limitation to this.

Effects of the second embodiment of the present invention are described.

In the case of performing the garage shift, the hydraulic pressure supplied to the low brake 32 or the reverse brake 34 is controlled by the accelerator pedal select control after the supply of the hydraulic pressure to the low brake 32 or the reverse brake 34 is started. Since the hydraulic pressure higher than in the normal select control is supplied to the low brake 32 or the reverse brake 34 in this way, a delay of the engagement of the low brake 32 or the reverse brake 34 can be suppressed.

After the elapse of the predetermined time following the start of the accelerator pedal select control, a switch is made to the normal select control, thereby being able to suppress sudden engagement of the low brake 32 or the reverse brake 34 and the occurrence of an engagement shock.

Although the embodiments of the present invention have been described above, the above embodiments are merely application examples of the present invention and not intended to limit the technical scope of the prevent invention to the specific configurations of the above embodiments.

In the second embodiment, the hydraulic pressure supplied to the low brake 32 or the reverse brake 34 is controlled by the accelerator pedal select control when the accelerator pedal opening APO has become equal to or larger than the predetermined opening. However, the hydraulic pressure supplied to the low brake 32 or the reverse brake 34 may be controlled by the accelerator pedal select control when the throttle valve opening TVO has become equal to or larger than the predetermined opening. Effects similar to those of the second embodiment can be obtained also by this.

The engagement controls of the above embodiments can be used in multi-stage transmissions, continuously variable transmissions with a forward/reverse switching mechanism and the like.

The present application claims a priority based on Japanese Patent Application No. 2014-126672 filed with the Japan Patent Office on Jun. 19, 2014, all the contents of which are hereby incorporated by reference.

The invention claimed is:

1. A hydraulic control device for automatic transmission including an electronically controlled throttle device for changing a throttle valve opening of a prime mover by an electric actuator on the basis of an accelerator pedal opening and configured to supply a hydraulic pressure to a friction engaging element of a transmission on the basis of the throttle valve opening, comprising:
a controller configured to detect the accelerator pedal opening, configured to detect the throttle valve opening, configured to detect a position of a shift lever, and configured to control a start timing of a supply of the hydraulic pressure to the friction engaging element on the basis of the accelerator pedal opening and the throttle valve opening if the shift lever is changed from an advance position to a reverse position or from the reverse position to the advance position.

2. The hydraulic control device for automatic transmission according to claim 1, wherein:
the controller starts the supply of the hydraulic pressure to the friction engaging element when at least one of the accelerator pedal opening and the throttle valve opening becomes equal to or larger than a threshold value if the shift lever is changed from the advance position to the reverse position or from the reverse position to the advance position.

3. The hydraulic control device for automatic transmission according to claim 1, wherein:
the controller starts the supply of the hydraulic pressure to the friction engaging element when the accelerator pedal opening becomes equal to or larger than a threshold value if the shift lever is changed from the advance position to the reverse position or from the reverse position to the advance position.

4. The hydraulic control device for automatic transmission according to claim 3, wherein:
the controller switches from the supply of the hydraulic pressure based on the accelerator pedal opening to the supply of the hydraulic pressure based on the throttle valve opening after an elapse of a predetermined time following a start of the supply of the hydraulic pressure to the friction engaging element on the basis of the accelerator pedal opening.

5. The hydraulic control device for automatic transmission according to claim 1, wherein:
the throttle valve opening is smaller than the accelerator pedal opening.

6. A control method for a hydraulic control device including an electronically controlled throttle device for changing a throttle valve opening of a prime mover by an electric actuator on the basis of an accelerator pedal opening and configured to supply a hydraulic pressure to a friction engaging element of a transmission on the basis of the throttle valve opening, comprising:
detecting the accelerator pedal opening;
detecting the throttle valve opening;
detecting a position of a shift lever; and
controlling a start timing of a supply of the hydraulic pressure to the friction engaging element on the basis of the accelerator pedal opening and the throttle valve opening if the shift lever is changed from an advance position to a reverse position or from the reverse position to the advance position.

7. A hydraulic control device for automatic transmission including an electronically controlled throttle device for changing a throttle valve opening of a prime mover by an electric actuator on the basis of an accelerator pedal opening and configured to supply a hydraulic pressure to a friction engaging element of a transmission on the basis of the throttle valve opening, comprising:
accelerator pedal opening detection means for detecting the accelerator pedal opening;
throttle valve opening detection means for detecting the throttle valve opening;
shift lever position detection means for detecting a position of a shift lever; and
hydraulic control means for controlling a start timing of a supply of the hydraulic pressure to the friction engaging element on the basis of the accelerator pedal opening and the throttle valve opening if the shift lever is changed from an advance position to a reverse position or from the reverse position to the advance position.

8. The hydraulic control device for automatic transmission according to claim 2, wherein:
the controller starts the supply of the hydraulic pressure to the friction engaging element when the accelerator pedal opening becomes equal to or larger than a threshold value if the shift lever is changed from the advance position to the reverse position or from the reverse position to the advance position.

9. The hydraulic control device for automatic transmission according to claim 2, wherein:
the throttle valve opening is smaller than the accelerator pedal opening.

10. The hydraulic control device for automatic transmission according to claim 3, wherein:
the throttle valve opening is smaller than the accelerator pedal opening.

11. The hydraulic control device for automatic transmission according to claim 4, wherein:
the throttle valve opening is smaller than the accelerator pedal opening.

* * * * *